United States Patent [19]
Wilkerson, III et al.

[11] Patent Number: 5,442,091
[45] Date of Patent: Aug. 15, 1995

[54] ASSOCIATIVE MONOMERS

[75] Inventors: John M. Wilkerson, III, Hixson; Daniel W. Verstrat, Ooltewah; Milagros C. Barron, Hixson, all of Tenn.

[73] Assignee: National Starch and Chemical Investment Holding Corporation, Wilmington, Del.

[21] Appl. No.: 339,612

[22] Filed: Nov. 15, 1994

Related U.S. Application Data

[62] Division of Ser. No. 172,626, Dec. 22, 1993, Pat. No. 5,412,142, which is a division of Ser. No. 85,851, Jun. 30, 1993, Pat. No. 5,294,692.

[51] Int. Cl.$^6$ ............................................. C07C 271/00
[52] U.S. Cl. ........................................ 560/33; 560/166
[58] Field of Search .................................. 560/33, 166

[56]        References Cited
         U.S. PATENT DOCUMENTS

| | | | |
|---|---|---|---|
| Re. 33,008 | 8/1989 | Ruffner et al. | 526/270 |
| Re. 33,156 | 1/1990 | Shay et al. | 526/301 |
| 3,657,175 | 4/1972 | Zimmerman | 260/29.6 T |
| 4,314,044 | 2/1982 | Hughes et al. | 260/29.6 M |
| 4,351,754 | 9/1982 | Dupré | 524/445 |
| 4,384,096 | 5/1983 | Sonnabend | 526/313 |
| 4,394,491 | 7/1983 | Hoffman | 525/452 |
| 4,514,552 | 4/1985 | Shay et al. | 526/301 |
| 4,559,159 | 12/1985 | Denzinger et al. | 252/174.24 |
| 4,600,761 | 7/1986 | Ruffner et al. | 526/270 |
| 4,647,396 | 3/1987 | Denzinger et al. | 252/174.24 |
| 4,663,385 | 5/1987 | Chang et al. | 524/523 |
| 4,743,478 | 5/1988 | Ruffner et al. | 549/478 |
| 4,792,343 | 12/1988 | Hawe et al. | 44/51 |
| 4,916,183 | 4/1990 | Barron et al. | 524/555 |
| 5,009,805 | 4/1991 | Perner et al. | 252/174.24 |
| 5,011,978 | 4/1991 | Barron et al. | 560/221 |
| 5,013,787 | 5/1991 | Barron et al. | 524/555 |
| 5,021,525 | 6/1991 | Montague et al. | 526/210 |
| 5,102,936 | 4/1992 | Huth et al. | 524/247 |
| 5,104,953 | 4/1992 | Sasagawa et al. | 526/301 |
| 5,109,091 | 4/1992 | Schafheutle et al. | 526/301 |
| 5,147,576 | 9/1992 | Montague et al. | 252/174 |
| 5,166,285 | 11/1992 | Sasagawa et al. | 526/288 |
| 5,173,534 | 12/1992 | Biale | 524/555 |
| 5,191,051 | 3/1993 | Shay et al. | 526/301 |

FOREIGN PATENT DOCUMENTS

| | | |
|---|---|---|
| 2028040 | 1/1989 | Canada . |
| 0248612 | 9/1987 | European Pat. Off. . |
| 0297686 | 6/1988 | European Pat. Off. . |
| 2202848 | 10/1988 | European Pat. Off. . |
| 0330614 | 2/1989 | European Pat. Off. . |

OTHER PUBLICATIONS

Anon., Technical Bulletin, Dow Chemical Company, "Butylene Oxide Polymers From The Dow Chemical Company", 1990.

Anon., Technical Bulletin, Dow Chemical, Company, "Block Copolymer Nonionic Surfactants Based On Butylene Oxide From The Dow Chemical Company", 1990.

V. Mark Nace et al., "Polyoxybutylene Glycol As A Versatile Hydrophobe For Nonionic Surfactants", AOCS Annual Meeting, Apr. 24, 1990.

Anon., Technical Bulletin, American Cyanamid Company, "TMI ® (META) Unsaturated Aliphatic Isocyanate", Nov. 1990.

*Primary Examiner*—Jeffrey T. Smith
*Attorney, Agent, or Firm*—William K. Wissing

[57]             ABSTRACT

Novel mono- and multi-functional non-ionic urethane monomers are prepared from surfactants comprising poly(ethylene oxide)(butylene oxide) copolymers, preferably $C_1$–$C_4$ alkoxy-terminated, monohydric, ethylene oxide/butylene oxide block polymers and monoethylenically unsaturated aliphatic isocyanates. When polymerized with, e.g. acrylic acid or alkyl acrylates, these monomers provide copolymers exhibiting greatly enhanced thickening efficiency.

5 Claims, No Drawings

5,442,091

ASSOCIATIVE MONOMERS

This application is a division of application Ser. No. 08/172,626, filed Dec. 22, 1993, now U.S. Pat. No. 5,412,142, which is a division of application Ser. No. 08/085,851, filed Jun. 30, 1993, which issued as U.S. Pat. No. 5,294,692 on Mar. 15, 1994.

BACKGROUND OF THE INVENTION

This invention relates to novel non-ionic urethane monomers and emulsion and solution polymers and copolymers comprising the non-ionic urethane monomers. The polymers comprising these novel monomers thicken, modify rheology, stabilize, suspend particles, control viscosity and otherwise enhance the physical properties of latex systems, coating compositions, sizings and printing pastes, paints, paper coatings, industrial coatings, petroleum drilling fluids, cleaners, detergents, personal care products and other aqueous solution or emulsion products.

Various polymeric materials based on mono and dicarboxylic acids are known. The properties of these polymers, in particular, the thickening efficiency of these polymers, has been improved by the inclusion of various surfactant monomers to produce associative copolymer thickening properties. These "associative thickeners" (polymers comprising associative monomers) have found use in materials such as lattices used as carpet and textile backing adhesives and in similar applications. Such copolymers are described in U.S. Pat. No. 5,013,789, issued May 7, 1991, to Barron, etal. Surfactant monomers suitable for making these associative copolymer thickeners are disclosed in U.S. Pat. No. 5,011,978, issued Apr. 30, 1991, to Barron, et al.

Other surfactant monomers and copolymers prepared from such monomers which are characterized by associative thickening properties are disclosed in U.S. Pat. No. 4,743,698, issued May 10, 1988, to Ruffner, et al., and U.S. Pat. No. 4,600,761, issued Jul. 15, 1986, to Ruffner, et al. The Ruffner monomers are copolymers prepared from an urethane reaction product of a non-ionic monohydric surfactant or a sorbitan fatty ester. The Barron monomer and copolymers are derived from the reaction product of a non-ionic amine-containing surfactant with an unsaturated isocyanate. When preparing copolymers of these monomers with acrylic acid, the urea (or urethane) monomer is incorporated into the backbone of the polymer along with the comonomers.

An associative thickener copolymer disclosed in U.S. Pat. No. 4,514,552, issued Apr. 30,, 1985, to Shay, et al., and reissued as Re33,156, Jan. 30, 1990, to Shay, et al., comprises an acrylic backbone, together with urethane side chains modified with poly(alkoxy) (surfactant) moieties. The surfactant moieties contain $C_6$–$C_{22}$ alkyl or $C_8$–$C_{22}$ aryl terminal groups to provide hydrophobicity to the side chains. A propoxylated alkali-soluble thickener disclosed in U.S. Pat. No. 5,191,051, issued Mar. 2, 1993 to Shay, et al., is an aqueous emulsion copolymer comprising about 0.5 to 40 weight percent of a monoethylenically unsaturated, hydrophobic nonionic monomer which is the reaction product of a monohydric or monoamine-terminated polypropoxylated or polybutoxylated hydrophobe with a monoethylenically unsaturated monomer having a single group which is reactive under the conditions employed, and provided said monoethylenically unsaturated, hydrophobic nonionic monomer is not the reaction product of a monohydric or monoamine-terminated polyethoxylated hydrophobe with a monoethylenically unsaturated monomer having a single group which is reactive under the conditions employed.

Other polymers having associative thickening properties are disclosed in U.S. Pat. Nos. 4,792,343, issued Dec. 20, 1988, to Hawe, et al.; 4,384,096, issued May 17, 1983, to Sonnabend; 3,657,175, issued Apr. 18, 1972, to Zimmerman; and 5,102,936, issued Apr. 7, 1992, to Huth, et al.

It has now been discovered that a variety of polymeric materials having superior associative thickening efficiency may be prepared from the novel nonionic urethane monomers of this invention. As a further benefit, these polymers have lower volatile organic compound residues than polymers known in the art for thickening compositions such as carpet backing adhesives. In one aspect, the monomer is the reaction product of approximately equimolar amounts of selected non-ionic, monohydric surfactants and a monoethylenically unsaturated isocyanate which reaction product may subsequently be polymerized to yield a polymer backbone comprising urethane moieties. In another aspect of this invention, selected non-ionic, multihydric surfactants are reacted with approximately two moles of a monoethylenically unsaturated isocyanate to provide a multifunctional monomer having associative thickening potential, as well as potential for crosslinking polymers so as to further enhance thickening efficiency.

As used herein the term "thickening efficiency" refers to the relative increase in viscosity or thickening effect produced by the addition of a minimum amount of a thickening agent of this invention to an aqueous system, e.g., an aqueous dispersion of a polymeric material or other insoluble materials, with that produced by a same amount of another thickening agent.

Such monomers may be advantageously produced from surfactants comprising poly(ethylene oxide)(butylene oxide) block $C_1$–$C_4$ alkoxy-terminated chains in lieu of the $C_6$–$C_{30}$ hydrocarbon terminal groups that have been traditionally used as the hydrophobe in associative monomers. Thus, the monomers of this invention surprisingly provide associative thickening properties to their acrylic copolymers in the absence of the hydrophobic moieties used in the prior art.

In addition to unexpected thickening efficiencies, the polymers prepared from the monomers herein provide a variety of benefit in applications such as carpet backing adhesives, including a reduction in the volatile organic chemical content of the finished carpet and improve adhesive tensile strength and froth stability, relative to conventional thickeners.

SUMMARY OF THE INVENTION

This invention provides novel monofunctional and multifunctional monomers comprising either Structure I (monofunctional):

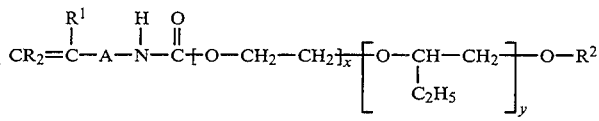

Structure I wherein R and $R^1$ are H, —$CH_3$ or —$CH_2CH_3$; $R^2$ is a $C_1$–$C_4$ linear or branched alkyl group; y is an integer from 1 to 50; x is an integer from 1 to 50; the sum of x +y is less than or equal to 100; and A is a $C_2$–$C_{20}$ alkyl, aryl, alkaryl or alkylene group; or Structure II (multifunctional):

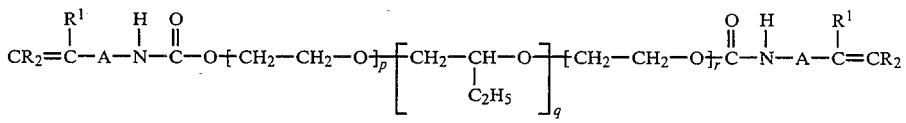

Structure II wherein R and $R^1$ are H, —$CH_3$ or —$CH_2CH_3$; q is an integer from 1 to 50; p and r are, independently, integers from 1 to 50; the sum of p+q+r is less than or equal to 150; and A is a $C_2$–$C_{20}$ alkyl, aryl, alkaryl or alkylene group.

The monomers are preferably the urethane reaction products of monoethylenically unsaturated aliphatic isocyanates, or of the reaction product of organic diisocyanates and a hydroxy ester of a $C_2$–$C_4$ epoxide and acrylic or methacrylic acid, with non-ionic surfactants. The monofunctional monomer may be prepared from a monohydric surfactant and the multifunctional monomer may be prepared from a di- or multi-hydric surfactant. The isocyanate may be selected from isocyanatoethylmethylacrylate and alpha-, alpha-dimethyl-m-isopropenylbenzylisocyanate. The non-ionic surfactant is a polyglycol, preferably comprising either a monohydric butylene oxide/ethylene oxide, Cl–$C_4$ alkoxy-terminated block polymer, or a dihydric ethylene oxide/butylene oxide/ethylene oxide triblock polymer.

This invention also provides solution and emulsion polymers and copolymers comprising the novel monomers of this invention.

DESCRIPTION OF THE PREFERRED EMBODIMENTS

The novel monomers used in preparing the polymers of this invention are urethane reaction products of a monoethylenically unsaturated isocyanate and nonionic surfactants comprising $C_1$–$C_4$ alkoxy-terminated, block copolymers of 1,2-butylene oxide and 1,2-ethylene oxide.

Preferred isocyanates for use in these monomers have the formulations shown in Structures III and IV below:

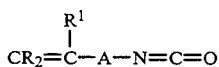

Structure III wherein R and $R^1$ are H, —$CH_3$ or —$CH_2CH_3$; and A is a $C_2$–$C_{20}$ alkyl, aryl or alkaryl alkylene group; and

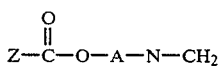

Structure IV wherein A is a $C_2$–$C_{20}$ alkyl, aryl, or alkaryl alkylene group, and Z is a $C_2$–$C_5$ ethylenically unsaturated alkylene group selected from the group consisting of $CH_2$=CH—, $CH_2$=CH ($CH_3$)—, $CH_2$=C (Cl)—, $CH_3CH$=CH—, and

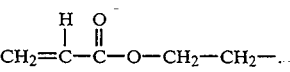

Suitable isocyanates for preparing the monomers of this invention include alpha, alpha-dimethyl-m-isopropenylbenzylisocyanate ("TMI") and isocyanatoethyl methacrylate ("IEM"), and the reaction product of organic diisocyanates with a hydroxy ester of a $C_2$–$C_4$ monoepoxide. Other vinyl-substituted monoisocyanates are suitable for use herein, provided such compounds are reactive with the mono- or multi-hydric non-ionic surfactants described herein. Examples of such isocyanates are provided in U.S. Pat. Nos. 4,514,522 and 4,743,698 and U.S. Re 33,156 which are hereby incorporated by reference.

The surfactants useful in preparing the monomers herein are butylene oxide/ethylene oxide polymers terminated with one or more hydroxy groups which are available for reaction with the isocyanate compounds. The monohydric butylene oxide/ethylene oxide polymers are terminated with one hydroxy group and one alkoxy group, having one to four carbon atoms. The multihydric butylene oxide/ethylene oxide polymers are terminated with more than one hydroxy group.

In a preferred embodiment, an ethylene oxide/butylene oxide/ethylene oxide block copolymer is the surfactant used to prepare the multifunctional monomers. In another preferred embodiment, a butylene oxide/ethylene oxide block copolymer is used to prepare the monofunctional monomer.

The butylene oxide polymers and copolymers have a molecular weight range between about 500 and 6,100, preferably between 1,000 and 3,000, most preferably between 1,000 and 1,500.

Suitable butylene oxide/ethylene oxide polymers may be obtained from the Dow Chemical Company under the tradename Polyglycol B-50-6600 (dihydric surfactant) and Polyglycol BL50-1500 (monohydric surfactant).

Butylene oxide/ethylene oxide copolymers suitable for use herein have a molar ratio of 3 to 1, preferably 1 to 1, of butylene oxide to ethylene oxide.

Any other non-ionic surfactants comprising butylene oxide units and having the formula shown in Structures V or VI, below, may be employed herein:

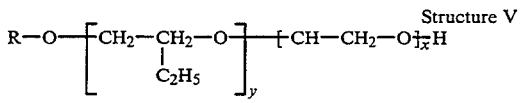

Structure V wherein R is a $C_1$ to $C_4$ linear or branched alkoxy group; y is an integer from 1 to 50; x is an integer from 1 to 50; and the sum of $x+y$ is less than or equal to 100; and

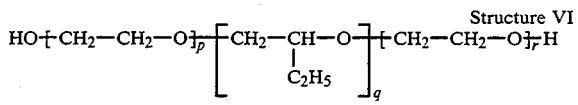

Structure VI wherein q is an integer from 1 to 50; p and r are, independently, integers from 1 to 50 and the sum of $p+q+r$ is less than or equal to 150.

The novel monomers may be prepared using standard procedures known in the art for reaction of an alcohol with an isocyanate group (e.g., addition reaction). Suitable reactions conditions include, but are not limited to, the conditions described in the Examples herein. Using such conditions, essentially quantitative yields are obtained and no by-products are formed. Therefore, purification of the monomer is an optional step which may be accomplished by any means known in the art.

Homopolymers and copolymers comprising the novel monomers of this invention are characterized by enhanced thickening efficiency in aqueous systems and are particularly useful in commercial aqueous systems such as carpet backing coatings, adhesives, suspension and dispersion systems for pigments and paints, coatings, industrial muds, clays and ores and other slurries.

The polymers of this invention are characterized by an extremely low volatile organic chemical content. This provides a tremendous improvement over conventional polymers used in the carpet industry which has experienced safety and environmental pressures to reduce the amount of volatile organic chemicals released from carpets into homes and offices. The polymers herein may be used as the sole rheology modifier or may be used in conjunction with other polymeric thickeners, whether associative in nature or traditional polymeric thickeners, and other rheology modifiers, such as surfactants.

Alone or in combination with other polymeric thickeners, dispersants and gelling agents, the polymers of this invention are useful in coatings, (e.g., paper coatings), textile sizings, textile printing pastes, paints and any industrial coatings where a water soluble resin can be utilized. They are also useful as thickening agents in latex based adhesives, where clays, other fillers, pigments and the like are present. In addition, alkali soluble emulsion polymers and copolymers find application in cleaners, laundry detergents, lotions, toothpastes, and other cosmetic and personal care products. In petroleum exploration, acrylic copolymers are used as drilling fluid additives for viscosity control and as bentonite extenders for enhancing performance of the drilling fluid, e.g., water soluble alkali metal polyacrylates copolymers are useful additives in drilling fluids based on fresh water.

The polymers of this invention may be prepared using conventional free-radical polymerization processes, preferably an aqueous solution polymerization process or an aqueous emulsion polymerization process, including but not limited to, the processes described in the Examples herein.

Following emulsion polymerization, the copolymer may be hydrolyzed by treatment with alkali to form a neutralized salt of the copolymer in solution for certain adhesive, coating and particle suspension applications requiring an alkaline thickening polymer.

Upon addition of an alkaline material such as an alkali metal hydroxide, sodium carbonate, or other bases such as ammonium hydroxide, methylamine or diethylamine, at least some of the free carboxy groups in the polymer are neutralized, rendering the copolymer soluble in water. At a low pH, e.g. a pH below about 5.5, the emulsion polymer exists in the form of discrete, water insoluble particles, having an average particle size of about 0.1 to 5 microns. Average molecular weights of the copolymers are estimated to be between about 100,000 and 5,000,000. Preferred copolymers have an average molecular weight of from about 500,000 to 1,000,000.

The homopolymers comprise at least two moles of the monofunctional or multi-functional associative monomers of this invention. The homopolymers are preferably polymerized neat, or at low solids (e.g., less than about 15%) in an aqueous polymerization process.

The copolymers comprise:

(a) 30 to 99 mole percent monoethylenically unsaturated $C_3$-$C_8$-monocarboxylic acid, monoethylenically unsaturated $C_4$-$C_8$-dicarboxylic acid, esters of monoethylenically unsaturated $C_4$-$C_8$-dicarboxylic acids, esters of monoethylenically unsaturated $C_3$-$C_8$-monocarboxylic acid, vinyl esters of saturated $C_1$-$C_8$-monocarboxylic acid or a mixture thereof; and (b) 0.1 to 70 mole percent of the non-ionic urethane monomers of this invention.

In a preferred embodiment, an emulsion copolymer comprises 0.1 to 20 mole percent of monomer (b) and 80 to 99 mole percent of monomer (a), wherein monomer (a) comprises less than 80% mono- or di-carboxylic acid. In a preferred embodiment the emulsion copolymer is prepared from 30 to 99 mole percent alkyl esters of carboxylic acid monomers, preferably methyl acrylate or ethyl acrylate.

In general, hydrophobic monomers are selected for preparation of emulsion copolymers.

The (a) monomer may be selected from alpha, beta-ethylenically unsaturated carboxylic acid monomers having the general formula

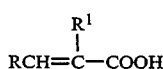

where R is H and $R^1$ is H, or an alkyl group containing from 1 to 4 carbon atoms, or $-CH_2COOX$; R is $-COOX$ and $R^1$ is H, and X is H or an alkyl group containing from 1 to 4 carbon atoms.

Examples of these acid monomers include such monobasic acids as acrylic, methacrylic, crotenic, and acyloxypropionic acid. Dibasic acid monomers include maleic, fumaric, and itaconic acid. Monomers which are monoesters of dibasic acids, such as the monobutyl ester of maleic acid can also be used to advantage. Acrylic and methacrylic acid are preferred acid monomers.

The (a) monomer also may be selected from non-ionic alpha, betaethylenically unsaturated monomers, of the formula:

CH$_2$—CYZ where Y is H and Z is CN, Cl, —COOR, —C$_6$H$_4$R,

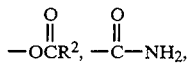

or —CH=CH$_2$; Y and Z are Cl; and Y is CH$_3$ and Z is CN,

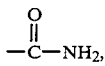

—CH=CH$_2$, —C$_6$H$_4$R, or —COOR$^1$; and R is H, Cl, Br or an alkyl group containing from 1 to 4 carbon atoms; R$^1$ is an alkyl group containing from 1 to 12 carbon atoms, or hydroxyalkyl group containing from 2 to 8 carbon atoms, and R$^2$ is an alkyl group containing from 1 to 8 carbon atoms.

Examples of these nonionic monomers are the C$_1$–C$_{18}$ alkyl and C$_2$–C$_{18}$ hydroxyalkyl esters of acrylic and methacrylic acids, such as methyl acrylate, ethyl acrylate, butyl acrylate, 2-ethyl hexyl acrylate, methyl methacrylate, ethyl methacrylate, butyl methacrylate, 2-hydroxybutyl acrylate, 2-hydroxyethyl methacrylate, 2-hydroxypropyl methacrylate, lauryl methacrylate, styrene, butadiene, isoprene, vinyl chloride, vinylidene chloride, acrylonitrile, methacrylonitrile, vinyl acetate, vinyl butyrate, vinyl caprolate, p-chloro styrene, isopropyl styrene, vinyl toluene and the like. The preferred monomers are acrylate and methacrylate esters alone or mixtures thereof with styrene, acrylonitrile, or vinyl acetate.

In a preferred embodiment, a solution copolymer is prepared from a mixture of monomers comprising 0.1 to 20 mole percent of monomer (b) and 70 to 99.9 mole percent of monomer (a), wherein monomer (a) comprises at least 90 mole percent carboxylic acid monomer, most preferably acrylic acid.

The copolymers may further comprise about 1 to 30 mole percent of at least one optional comonomer in addition to the (a) and (b) monomers described above. Examples of suitable, preferred comonomers are described above and also include any monomer that is susceptible to free radical polymerization with the (a) and (b) monomers.

Preferred optional comonomers are water soluble and may be polymerized by a solution polymerization process. Water soluble is defined herein the mean comonomers which have a minimum solubility of 5% by weight in water at 25° C. Such comonomers include acrylic, methacrylic, and ethacrylic acid, alpha-chloroacrylic acid, alpha-cyano-acrylic acid, beta-methyl-acrylic acid (crotonic acid), alpha-phenyl-acrylic acid, beta-acryloxy propionic acid, sorbic acid, alpha-chloro sorbic acid, angelic acid, cinnamic acid, p-chloro cinnamic acid, beta-styryl-acrylic acid (1-carboxy-4-phenyl butadiene-1,3), itaconic acid, citraconic acid, mesaconic acid, glutaconic acid, aconitic acid, fumaric acid, and tricarboxy ethylene.

Also useful herein are the corresponding anhydride monomers formed by the elimination of one molecule of water from two carboxylic acids located on the same polycarboxylic acid molecule. The preferred carboxylic acid monomers for use in this invention are the monoethylenically unsaturated acrylic acids having a substituent selected from hydrogen, halogen and hydroxyl groups, monovalent alkylene radicals, monovalent aryl radicals, monovalent aralkyl radicals, monovalent alkaryl radicals and monovalent cycloaliphatic radicals.

Other comohomers useful herein include acrylamide, methacrylamide, acrylonitrile, N,N-dialkylaminoalkyl acrylates and methacrylates, ethylenically unsaturated quaternary ammonium salts, such as N,N,N-trimethylaminomethyl methacrylate methylsulfate or halide, 2-hydroxy-3-methacryloxypropyltrimethylammonium methyl sulfate or halide, vinylbenzyltrialkylammonium methylsulfate or halide, sodium or ammonium styrene sulfonate, vinyl pyrrolidone, hydroxy alkyl acrylates and methacrylates, sodium 2-acrylamide-2-methylpropane sulfonate, and the like. Other comohomers that are particularly useful herein include diallylamine, hydroxypropyl acrylate, hydroxyethylacrylate and vinyl acetate.

It will be recognized by the practitioner that other comonomers may be useful -herein, including substantially water insoluble comonomers when the copolymer is prepared in a solvent or by an emulsion polymerization process. Such comonomers include, for example, C$_2$–C$_{30}$ olefins.

The following examples, in which all parts are by weight unless otherwise indicated, are presented as a means of further describing the preparation and use of the novel copolymers of this invention, and should not be considered as limiting the scope of the invention.

EXAMPLE 1

This example illustrates the preparation of a monofunctional non-ionic urethane monomer from a nonionic, monohydric surfactant and a monoethylenically unsaturated aliphatic isocyanate.

A total of 103.5 g.(0.1050 moles) of polyglycol BL50-1500 (1,500 mol. wt. monohydric, poly(butylene oxide) poly(ethylene oxide) surfactant), obtained from the Dow Chemical Company, Freeport, Texas, was slowly heated in a 1-liter reactor fitted with a thermometer, stirrer, reflux condenser, and heating mantle. When the temperature of the surfactant reached 55° C., 0.206 g of a monomethyl ether of hydroquinone and 0.200 g of stannous octoate were added. The solution was maintained at 55° C. and 21.14 g (0.1035 mole) of alpha,alpha-dimethyl-m-isopropenyl benzyl isocyanate ("TMI") (obtained from American Cyanamid Corporation, Wayne, N.J.) were added dropwise from an addition funnel over about a 45 minute period while the reaction mixture was maintained at 55° C. to 60° C. The reaction mixture was then cooked 2 hours at 57° C. The final product after cooling was a viscous solution.

EXAMPLE 2

Using the procedure of Example 1, additional monomers were prepared for comparative purposes from TMI and the group of non-ionic surfactants listed in Table I, and described below. Each of the monomers was copolymerized by the method of Example 6, below, with acrylic acid at a weight ratio of 5:95 monomer:acrylic acid and the copolymers were tested for solids, pH, viscosity and thickening efficiency. Thickening efficiency was measured in a 82% solids, 600 load carpet precoat compound. Thickening efficiency was measured as the grams of polymer (on a dry weight basis) added to a carpet precoat compound to yield a precoat compound viscosity of 13,000 to 14,000 cps using a Brookfield RVT viscometer with a #6 spindle at 20 rpm. Results are shown in Table I.

Copolymer A

A urethane monomer was prepared from TMI and monohydric methoxypoly (ethylene) glycol (mol. wt. about 750) (Sample TB90017, obtained from Dow Chemical)° The monomer was polymerized with acrylic acid (5:95 monomer:acrylic acid). The thickening efficiency was only about one-half of the efficiency of a control polymer prepared from acrylic acid and the monomer of Example 1 in a 5:95 weight ratio.

Copolymer B

A urethane monomer was prepared from TMI and a monohydric, poly(butylene) oxide (mol. wt. about 750) (Polyglycol XU-13428.0, sample #92067 obtained from Dow Chemical). The thickening efficiency of the urethane/acrylic acid copolymer (B) was only about one-quarter of the control polymer efficiency.

Copolymer C

A urethane monomer was prepared from TMI and 1-butanol (obtained from Aldrich ChemicalCompany). The thickening efficiency of the urethane/acrylic acid copolymer (C) was only 19.15, compared to 0.98 for the control polymer efficiency.

Copolymer D

A urethane monomer was prepared from TMI and 1-hexanol (obtained from Aldrich Chemical Company). The thickening efficiency of the urethane/acrylic acid copolymer (D) was only about one-half of the control polymer efficiency.

Thus, the exceptional thickening efficiency obtained with the control polymer requires the presence of an associative monomer residue characterized by: (A) a terminal $C_1$–$C_4$ alkyl group, (B) ethylene oxide spacers within the butylene oxide groups to move the terminal $C_1$–$C_4$ alkyl group and the butylene oxide groups away from the hydrophilic polymer backbone, (C) more than one butylene oxide group, and (D) a polyglycol sidechain component which isolates the terminal Cl–$C_4$ alkoxy group from the polymer backbone.

EXAMPLE 3

This example illustrates the preparation of a multifunctional non-ionic urethane monomer from one mole of a non-ionic multihydric surfactant and two moles of a monoethylenically unsaturated aliphatic isocyanate.

A total of 210 g (0.1050 moles) of Polyglycol B50-6600 (6,600 mol. wt. dihydric, poly(ethylene oxide)-poly(butylene oxide)poly(ethylene oxide) triblock surfactant, obtained from the Dow Chemical Company) was used in place of the surfactant in the process of Example 1. The urethane monomer prepared from TMI and the Polyglycol B50-6600 surfactant was an off-white wax having a solids content of 100 percent, and a pH of 7.1. The preparation of acrylic acid copolymer (5:95 weight ratio) was carried out by the process described in Example 6.

EXAMPLE 4

This example illustrates the preparation of homopolymers of the urethane monomer of Examples 1 and 3.

Part A

A sample of 45 g of the monomer of Example 1 and 255 g of water were charged to a 1-liter reactor fitted with a thermometer, stirrer, reflux condenser and heating mantle. The monomer was heated to 70° C. and an azo initiator azo-bis-(2-methylpropane nitrile) was added. The reaction was permitted to continue for 2 hours during which the viscosity of the reaction mixture increased. The reaction mixture was cooled to room temperature and the product recovered.

The product had a melting point in excess of 240° C. which contrasts with the melting point of the monomer of Example 1 (i.e., about 42° C.) and indicates the monomer had been successfully polymerized.

The product was tested in solution at 13% solids for thickening efficiency in the precoat composition of Example 2. When used in the carpet precoating compound at a level of 69.04 g, the product solution exhibited a viscosity of 3,910 cps. This viscosity contrasts with that of 69.04 g of a 13% solids solution of the monomer of Example 1, which was measured to be 1,830 cps, and indicates the formation of a homopolymer.

Part B

The monomer of Example 3 is polymerized by the method described in Part A. The product is viscous, has a higher melting point and exhibits greater thickening efficiency than the monomer of Example 3.

EXAMPLE 5

This example illustrates the preparation of copolymers from the urethane monomers of Examples 1 and 2 by an emulsion polymerization processes.

A mixture of 198.5 g water and 6.1 g of sodium lauryl sulfate was charged to a 1-liter reactor fitted with a thermometer, stirrer, condenser, and heating mantle.

A pre-emulsion of monomers was prepared in a beaker by mixing 262.7 g water, 22.8 g of urethane monomer prepared according to Example 1, 91.4 g (1.06 moles) methacrylic acid, 114.1 g (1.14 moles) ethyl acrylate, 262.1 g water and 6.1 g sodium lauryl sulfate.

The reactor charge was heated to 80° C. and 0.44 g potassium persulfate in 48.46 g water was added. The monomer pre-emulsion was added from an addition funnel at constant rates over 90 minutes while maintaining the reaction mixture at 80° C. The latex formed was cooked at 88° C. for 1 hour, 100 g water were added, and the mixture was cooled to 30° C.

A solution of the methacrylate/ethylacrylate/urethane copolymer emulsion was prepared by adding 145 g of a 25 percent solution of sodium hydroxide (0.906 eq.) to the latex with mixing over 10 minutes. The mixture was heated to 90° to 95° C. and cooked at that temperature for 16 hours to yield a sodium polyacrylate/urethane copolymer solution.

The solutions containing the emulsion polymerization copolymers prepared from the monomers of Examples 1, 2 and 3 were tested for thickening efficiency and other characteristics. Results are shown in Table II, below.

TABLE I

Monomers and Solution Copolymers

| Copolymer | Sample | Associative Monomer Surfactant[a] | Comonomer[b] | Solids[c] | pH[c] | Viscosity[c] | Thickening[d] Dry Grams | Efficiency |
| --- | --- | --- | --- | --- | --- | --- | --- | --- |
| Control | 336 | HO—(EO)(BO)—$C_4H_9$ | AA | 12 | 12 | 61500 | | 0.98 |
| A | 013 | HO—(EO)—$CH_3$ | AA | 14 | 7 | 85500 | | 1.78 |
| B | 014 | HO—(BO)—$C_4H_9$ | AA | 17 | 6.2 | 1020 | | 4.4 |
| C | 025 | HO—$C_4H_9$ | AA | 14 | 5.5 | 5 | | 19.15 |
| D | 026 | HO—$C_6H_{13}$ | AA | 17 | 6.7 | 31500 | | 1.92 |
| E[e] | 321 | HO—(EO)(BO)(EO)—OH | | | | | | |
| F[f] | 336 | HO—(EO)(BO)—$C_4H_9$ | AA | 13 | 6.7 | 22000 | | 1.18 |
| G[g] | 336 | HO—(EO)(BO)—$C_4H_9$ | AA | 13 | 7 | 35500 | | 1 |
| H[h] | 336 | HO—(EO)(BO)—$C_4H_9$ | AA | 13 | 6.6 | 76000 | | 0.775 |

[a] Surfactant variables are described in Example 2.
[b] Comonomer was (AA) acrylic acid.
[c] Viscosity was measured at the indicated pH and solids level using a Brookfield Viscometer with a #7 spindle at 20 rpm.
[d] Thickening efficiency was measured using the method of Example 2.
[e] Copolymer was crosslinked by incorporation of multifunctional associative monomer of invention (Example 2).
[f] Copolymer was used in conjunction with another rheology modifier, a surfactant (Brij 56 surfactant, obtained f(om ICI Americas, Wilmington, Del.).
[g] Copolymer was used in conjunction with another rheology modifier, a surfactant (Sipex sb surfactant, obtained from Alcolac, Inc., Baltimore, MD).
[h] Copolymer was used in conjunction with another rheology modifier, a surfactant (Katapol PN-430 surfactant, obtained from GAF Corporation, Wayne, New Jersey).

TABLE II

Monomers and Emulsion Copolymers

| Copolymer | Sample | Associative Monomer Surfactant[a] | Comonomer[b] | Solids[c] | pH[c] | Viscosity[c] | Thickening[d] Dry Grams Efficiency |
| --- | --- | --- | --- | --- | --- | --- | --- |
| Control E | 336 | HO—(EO)(BO)—$C_4H_9$ | MA | 12 | 12 | 6160 | 1.27 |
| Control E | 336 | HO—(EO)(BO)—$C_4H_9$ | MA | 13 | 9.8 | 35000 | 0.645 |
| Control I | 013 | HO—(EO)—$CH_3$ | MA | 13 | 10 | 13800 | 1.26 |
| Control J | 014 | HO—(BO)—$C_4H_9$ | MA | 14 | 9.9 | 13500 | 1.04 |
| Control K | 025 | HO—$C_4H_9$ | MA | 13 | 12 | 11300 | 1.56 |
| Control L | 026 | HO—$C_6H_{13}$ | MA | 13 | 13 | 9100 | 1.66 |

[a] Surfactant variable are described in Example 2.
[b] Comonomer was (MA) methyl acrylate.
[c] Viscosity was measured at the indicated pH and solids level using a Brookfield Viscometer with a #7 spindle at 20 rpm.
[d] Thickening efficiency was measured using the method of Example 2.
[e] Copolymer was used in conjunction with another rheology modifier, a surfactant (Brij 56 surfactant obtained from ICI Americas, Inc., Wilmington, Del.).

EXAMPLE 6

A solution polymerization process was used to polymerize the urethane monomers of this invention.

A mixture of 568.5 g water and 4.5 g of the urethane monomer of Example 1 was charged to a 1 liter reactor fitted with a thermometer, stirrer, condenser and heating mantle.

The charge was heated to 80° C. and a mixture of 0.45 g divinyl benzene and 105.45 g acrylic acid (95 mls) was added dropwise over about 90 minutes along with 0.23 g sodium persulfate in solution (28 mls). The temperature was maintained at 80° C. and the reaction was permitted to continue for one hour with a post-addition of sodium persulfate during the first 15 minutes. Following polymerization, 91 g of water and a solution containing 40 g of ammonium hydroxide were added to the copolymer solution.

Similar comparative copolymers were prepared from the urethane monomers of Example 2. Results are shown in Table I.

EXAMPLE 7

The polymer of Examples 1 and 6 (Table 1, "Control" solution copolymer) is used as an efficient thickener in the carpet coating compositions shown in Table III, below.

TABLE III

CARPET COATING COMPOSITION

| | Parts by Weight[f] | | | | |
| --- | --- | --- | --- | --- | --- |
| Ingredient | Control | C | D | E | F |
| Styrene Butadiene Latex[a] | 188.5 | 188.5 | 188.5 | 188.5 | 188.5 |
| DURA-BOND ® H Adhesive[b] | — | — | — | — | 8.0 |
| Calcium Carbonate Filler[c] | 200.0 | 199.0 | 199.0 | 199.0 | 199.0 |
| Jute Color[d] | — | — | — | .1 | — |
| Froth Aid CF 1885-A[d] | 2.5 | 2.5 | — | 2.5 | 2.5 |
| Table I Thickener[e] | — | 12.0 | 12.0 | 12.0 | 4.0 |
| Paragum P-178 | 12.0 | — | — | — | — |

[a] Dow 8300 latex is obtained from Dow Chemical Company, Midland, Michigan.
[b] DURA-BOND H adhesive is obtained from National Starch and Chemical Company, Bridgewater, New Jersey.
[c] Grade D-90 filler is obtained from Georgia Marble, Dalton, Georgia.
[d] Jute color Is obtained from Standard Adhesive, Dalton, Georgia, and Froth Aid from Cham-Tex, Charlotte, North Carolina.
[e] See Examples 1 and 6, and "control" copolymer of Table I.
[f] The thickener of the prior art, Paragum P-178 thickener, is obtained from Parachem Inc., Simpsonville, South Carolina.
[g] The amount of thickener(s) used in each sample is adjusted to provide a coating viscosity of 13,000 to 14,000 cps by the method of Example 2.

The coating is applied to the carpet at 20 oz./sq. yd. The coating is aerated with 30% air prior to coating the carpet.

The copolymer of this invention is an efficient thickener in a carpet back coating composition, having performance equivalent to a commercial thickener used in carpet coating compositions.

EXAMPLE 8

The polymers of Examples 1 and 6 (Table I, "control" solution copolymer) were tested in an environmental test chamber for total volatile organic chemical emissions according to the "Standard Test Method for Determining TVOC Emission Factors from Carpet under Defined Test Conditions Using Small Environmental Chambers:Modification 1. Adhesive Products," as prepared by the Carpet Policy Dialogue, EPA, and the Adhesive and Sealant Council., finalized October, 1992.

A commercial carpet backing thickener (see Example 7) was also evaluated for comparative purposes. Results are shown in Table IV, below.

TABLE IV

| Sample | Environmental Chamber Test[a] | | |
|---|---|---|---|
| | Elapsed Exposure Hour | Formaldehyde Emission Factor μg/m²-hr | TVOC Emission Factor μg/m²-hr |
| Paragum P-178 Polymer-Commercial Thickener | 1 | 98.45 | 4122.62 |
| | 4 | N/A | 291.43 |
| | 24 | N/A | 11.90 |
| | 48 | N/A | 9.52 |
| | | Total TVOC Emissions | 5.028 mg/m² |
| Examples 1 & 6 Solution[b] Copolymer | 1 | nd | 54.05 |
| | 4 | N/A | 105.71 |
| | 24 | N/A | 4.05 |
| | 48 | N/A | 5.23 |
| | | Total TVOC Emissions | 0.735 mg/m² |

[a]nd = non-detectable (less than 12.0 μg/m²-hour); N/A = not analyzed; TVOC = total volatile organic chemicals.
[b]The copolymer was the "control" sample, Table I.

The polymers remained packaged until immediately prior to chamber evaluation. At that time, the polymer was applied at a load of 0.42 m²/m² to a stainless steel plate with a ¼″ short nap roller held at a 45° angle relative to the surface of the plate. The plate was then placed an a stainless steel tray and loaded into the SA3 environmental chamber. Testing was completed at 50.0% ±2.0% relative humidity and 23.0±1.0° C.

The results demonstrate the significantly lower volatile organic chemical content of the polymers of this invention relative to a polymer used commercially as a thickener in carpet coating compositions.

We claim:

1. A non-ionic urethane monomer comprising the structure

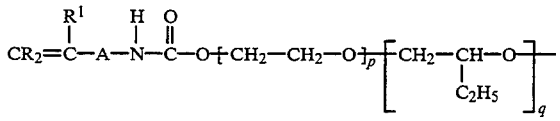

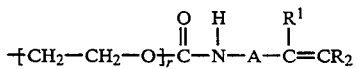

wherein R and $R^1$ are, independently, H, —$CH_3$ or —$CH_2CH_3$; q is an integer from 1 to 50; p and r are, independently, integers from 1 to 50 the sum of p+q+r is less than or equal to 150; and A is a $C_2$-$C_{20}$ alkyl, aryl, alkaryl or alkylene group.

2. The monomer of claim 1, wherein the monomer is the urethane reaction product of two moles of monoethylenically unsaturated aliphatic isocyanate with one mole of a nonionic, multihydric surfactant.

3. The monomer of claim 2, wherein the isocyanate is selected from the group consisting essentially of isocyanatoethylmethylacrylate and alpha-, alpha-dimethyl-m-isopropenyl benzyl isocyanate.

4. The monomer of claim 2, comprising the structure:

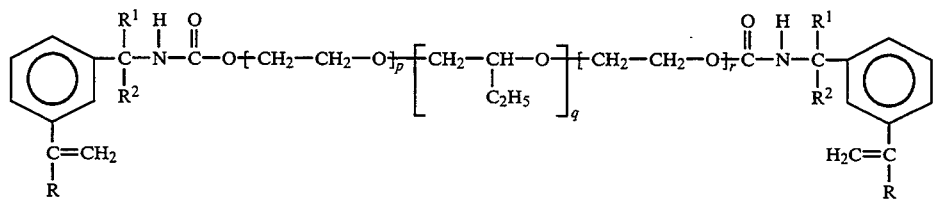

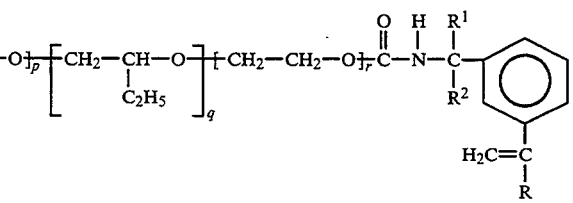

wherein R, $R^1$ and $R^2$ are H, —$CH_3$ or —$C_2H_5$; q is an integer from 1 to 50; p and r are, independently, integers from 1 to 50 and the sum of p+q+r is less than or equal to 150.

5. The monomer of claim 4, wherein R, $R^1$ and $R^2$ are —$CH_3$.

* * * * *